United States Patent
Vergel

(10) Patent No.: US 6,807,554 B2
(45) Date of Patent: Oct. 19, 2004

(54) METHOD, SYSTEM AND COMPUTER PROGRAM PRODUCT FOR DIGITALLY GENERATING A FUNCTION

(75) Inventor: Julio Alberto Vergel, San Diego, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 541 days.

(21) Appl. No.: 10/005,926

(22) Filed: Nov. 8, 2001

(65) Prior Publication Data

US 2003/0037081 A1 Feb. 20, 2003

Related U.S. Application Data

(60) Provisional application No. 60/311,781, filed on Aug. 10, 2001.

(51) Int. Cl.[7] .................................................. G06F 1/02
(52) U.S. Cl. ...................................................... 708/270
(58) Field of Search ................................ 708/270–276

(56) References Cited

U.S. PATENT DOCUMENTS

| | | | | |
|---|---|---|---|---|
| 5,142,487 A | * | 8/1992 | Graham, III | 708/276 |
| 5,406,584 A | * | 4/1995 | Erisman | 375/272 |
| 5,430,764 A | * | 7/1995 | Chren, Jr. | 708/271 |
| 6,005,419 A | * | 12/1999 | Rudish | 708/271 |
| 6,317,161 B1 | * | 11/2001 | Renner et al. | 348/536 |
| 6,320,431 B1 | * | 11/2001 | Potson et al. | 708/270 |
| 6,330,578 B1 | * | 12/2001 | Savin et al. | 708/270 |
| 6,365,816 B1 | * | 4/2002 | Rossum | 708/290 |
| 6,553,087 B1 | * | 4/2003 | Alelyunas et al. | 375/357 |
| 6,587,862 B1 | * | 7/2003 | Henderson | 708/276 |

* cited by examiner

*Primary Examiner*—Tan V. Mai
(74) *Attorney, Agent, or Firm*—John T. Whelan

(57) ABSTRACT

A method, system and computer program product for digitally generating a function, including a phase accumulator configured to receive a phase value and integrate the phase value to generate an accumulation result; an address generator configured to generate consecutive addresses based on the accumulation result; a storage device configured to initiative initial digital function values based on the consecutive addresses; a coefficient calculator configured to generate coefficients for a polynomial interpolation based on the initial digital function values; and an interpolator configured to generate a final digital function value corresponding to the phase value based on the accumulation result and the coeffcients.

16 Claims, 6 Drawing Sheets

METHOD, SYSTEM AND COMPUTER PROGRAM PRODUCT FOR DIGITALLY GENERATING A FUNCTION

This application claims the benefit of Provisional Application 60/311,781 filed Aug. 10, 2001.

BACKGROUND OF THE INVENTION

1. Field of the Invention

The present invention generally relates to function generators and more particularly to a method, system and computer program product for digitally generating a function. The present invention includes use of various technologies described in the references identified in the appended LIST OF REFERENCES and cross-referenced throughout the specification by numerals in brackets corresponding to the respective references, the entire contents of all of which are incorporated by reference herein.

2. Discussion of the Background

In wireless communications, high performance Voltage-Controlled Oscillators (VCOs) are not usually selected because of cost limitations. High step size in frequency and high delays to get to a stable frequency results in difficulties tracking frequency variations due to various factors, such as channel characteristics, drifts, Doppler shifts, [5] etc. One-way to track such frequency variations is by adding a device to take care of small frequency offsets coupled to the VCO. For this purpose, a Direct Digital Synthesis (DDS) device with high resolution and spectral purity can be used.

A typical DDS has two basic sections, a phase accumulator section and a set of samples stored in memory section (e.g., such as a Read Only Memory (ROM), etc.), which can be addressed. In such a typical design, a higher desired resolution results in a higher number of bits used in the phase accumulator section. Therefore, the number of samples that have to be stored increases as the desired resolution increases. However, larger ROMs bring additional problems, such as increased power consumption, larger needed chip (e.g., Application Specific Integrated Circuit ASIC, etc.) area, etc.

Consequently, techniques, such as Taylor series approximation [6], Nicholas architectures [3], Sunderland architectures [3], etc., have been proposed to address such problems. In these techniques, values are split in to two sets and stored in a coarse ROM and a fine ROM. This reduces the number of samples needed to generate a sine wave while maintaining a good spectral response. However, such techniques suffer from use of multiple ROMs to store the fine and coarse values, resulting increased power consumption, larger needed chip area, etc.

Therefore, there is a need for a method, system and computer program product for improving DDS with respect to ROM size in order to reduce power consumption and chip area.

SUMMARY OF THE INVENTION

The above and other needs are addressed by the present invention, which provides an improved method, system and computer program product for digitally generating a function.

Accordingly, in one aspect of the present invention there is provided a method, system and computer program product for digitally generating a function, including a phase accumulator configured to receive a phase value and integrate the phase value to generate an accumulation result; an address generator configured to generate consecutive addresses based on the accumulation result; a storage device configured to retrieve initial digital function values based on the consecutive addresses; a coefficient calculator configured to generate coefficients for a polynomial interpolation based on the initial digital function values; and an interpolator configured to generate a final digital function value corresponding to the phase value based on the accumulation result and the coefficients.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
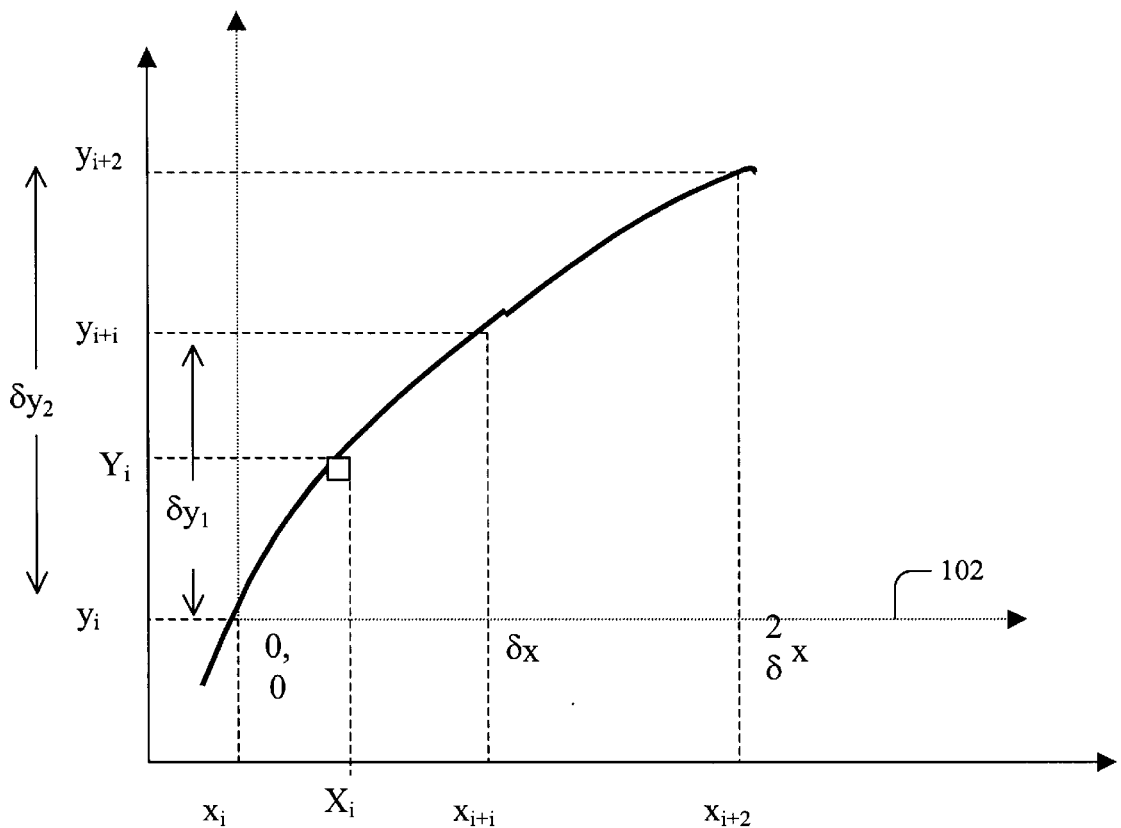
FIG. 1 is a graph for illustrating values and a new reference system used in a digital function generator, according to the present invention.

A method, apparatus and computer program product for digitally generating a function, are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Generally, the present invention improves the generation of a function digitally. The desired function is approximated using a polynomial and approximation coefficients are computed based on stored values. Such values do not exactly belong to the function, but they are obtained through a minimum quadratic-error minimization between a line and function values between two selected samples of the function. Such samples are selected based on a desired level of resolution. The present invention is different than other known methods, because the coefficients for a polynomial approximation are calculated for every value. In previous methods, these coefficients are stored using a second storage unit.

Referring now to the drawings, wherein like reference numerals designate identical or corresponding parts throughout the several views, and more particularly to FIGS. 1–7 thereof, there is illustrated a method, system and computer program product for digitally generating a function, according to the present invention, as will now be described.

An objective of the present invention is to maintain a reduced ROM size, so that a number of stored samples are minimized during digital function generation. Due to limited knowledge of function values for a given function, interpolation typically is required for determining unknown arguments and phases. The present invention includes obtaining coefficients of a polynomial approximation that best fits a portion of a curve of the function that is around a given point. In order to find such coefficients, a linear system of N equations and N unknown variables is generated, where N is an order of the polynomial approximation.

For the case where N=1, a linear approximation is obtained for every portion of the curve of the function. If N is greater than one, a better approximation is expected, but the complexity of the implementation increases. In certain cases, N=1 (i.e., linear interpolation) may exceed requirements for a given application.

A main difference between the present invention and known methods is that such known methods store additional values in a different ROM to make a fine-tuning of coarse values for the digital function to be generated. In contrast, the present invention calculates a polynomial approximation around a desired value based on known curve values.

For example, given some known values $y_i$ for a given function (e.g., a sine wave) corresponding to phases $x_i$ with i: 1 ... M, (i.e. $y_i=\sin(x_i)$), the present invention calculates a value $Y_i$ that is unknown for a particular phase $X_i$, as shown in FIG. 1. In order to do this, a polynomial approximation that best fits the small portion of the curve based on the known samples $y_i$ and $x_i$ is calculated. In order to approximate a portion of the curve with a polynomial function of order N, at least N+1 points around the sample are needed.

In general, a polynomial function can be expressed as follows:

$$Y_i = \sum_{j=0}^{N} a_j X_i^j \quad (1)$$

To calculate coefficients $a_j$ that best fit a selected portion of the curve, a linear system of N+1 equation and N+1 variables is solved using the $x_i$ and $y_i$ values. If the reference system is moved to the lower closest known sample, as shown by element 102 in FIG. 2 and the distance between two consecutive $x_i$ values is constant (i.e. $\delta x = x_{i+1} - x_i$, for any i), then the set of linear equations to find $a_j$ is given by:

$$\delta Y_i = \sum_{j=1}^{N} a_j i^j \delta x^j \quad (2)$$

For j=0, $a_0$ is equal to 0 due to the change to the new reference system 102, and the curve value is forced to 0 for x=0. As a result the real value to be found is $Y_i = y_i + \delta Y_i$.

Equation 2 can be used to generate approximations of any order. In particular, for a linear case, N=1, the result is as expected:

$$\delta y_1 = a_1 \delta x, \text{ therefore } a_1 = \delta y_1 / \delta x. \quad (3)$$

For an approximation of order two, the following equations are generated:

$$\delta y_1 = a_1 \delta x + a_2 67\ x^2$$

$$\delta y_2 = 2a_1 \delta x + 4a_2 \delta x^2$$

From here, the coefficients $a_1$ are obtained as follows:

$$a_1 = (4y_1 - y_2)/2\delta x^2$$

$$a_2 = (y_2 - 2y_1)/2\delta x \quad (4)$$

A similar method can be used to calculate the coefficients for any portion of the curve for whichever order approximation is desired.

Once the coefficients are obtained, the values $\delta Y_i$ can be calculated from equation 1. Finally, $Y_i$ can be found from $Y_i = y_1 + \delta Y_i$. The calculated $Y_i$ corresponds to the polynomial interpolation result the given section of the curve. For example, a linear approximation using the method of the present invention yields $Y_i = y_1 + \delta y_i / \delta x_i$.

Figure 3:
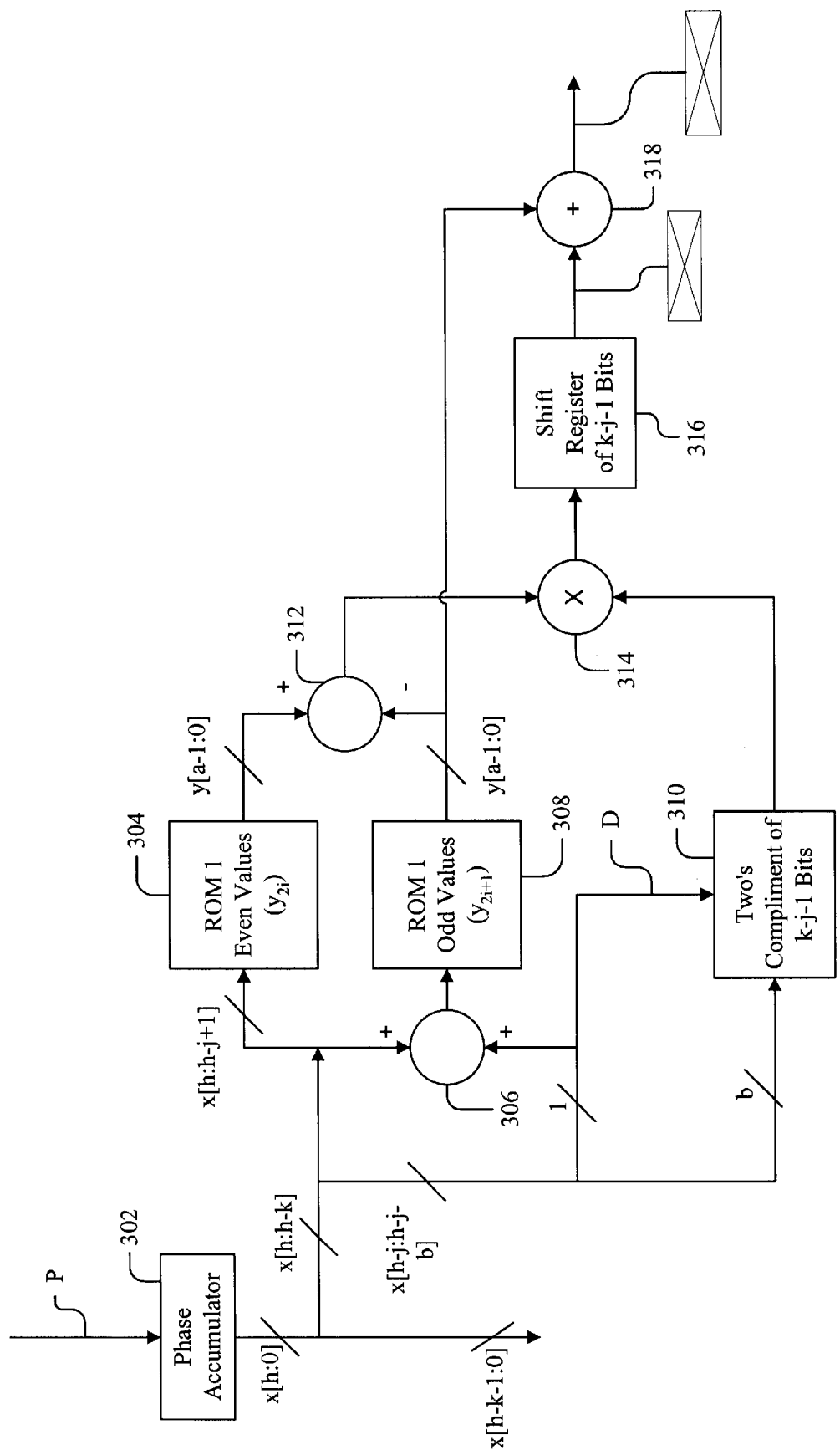
FIG. 3 is a block diagram for illustrating a digital function generator, according to the present invention.

Based on the above method, an apparatus to determine an approximation of any given function and in particular a sine wave is possible. For example, a block diagram of a sine wave generator based on linear interpolation is shown in FIG. 3. In FIG. 3, the apparatus includes a phase accumulator 302, ROMs 304 and 308, adders 306 and 318, two's compliment generator 310, subtractor 312, multiplier 314 and shift register 316. The components 302–318 of the apparatus of FIG. 3 may be implemented with a combination of hardware and/or software using techniques known in the art.

The linear interpolation apparatus based on equation 3 as shown in FIG. 3 will now be further described. To calculate the values $Y_i$, values for $\delta y_i$ are needed. These values can be determined by computing a difference between stored values $(y_{i+1} - y_i)$. The values $y_i$ are given by $y_i = \sin(\pi * i/(2M))$, where M is the number of samples.

Whenever an interpolation is performed, it is necessary to read two adjacent known $y_i$ values. The difference of two such values is $\delta y_i$. In order to facilitate the way to get these values, the known samples are split into two ROM's 304 and 308. It is only necessary to store even values $(y_{2i})$ in the ROM 304 and odd values $(y_{2i+1})$ in the ROM 308. In FIG. 3, the simplicity of accessing the values and the difference to arrive at the interpolation result $Y_i$ will be appreciated by those skilled in the art.

Figure 2:
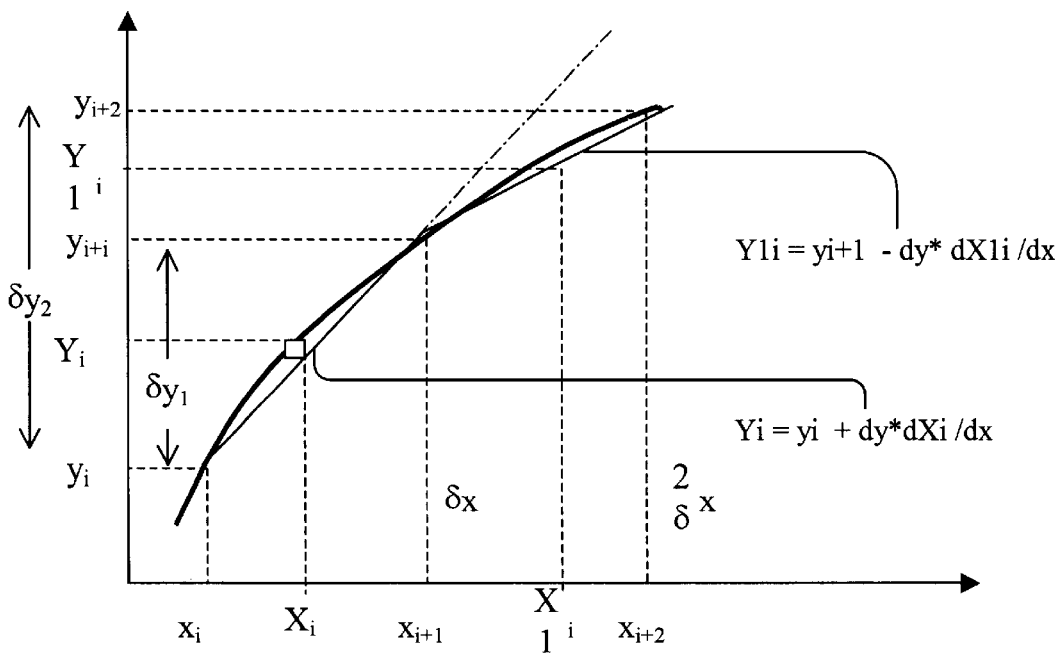
FIG. 2 is a graph for illustrating a linear interpolation technique used in a digital function generator, according to the present invention.

At first glance, the complexity of equations (3) and (4) can be seen due to the division associated with the calculation of coefficients. However, using the fact that the number of samples $x_1$ is a power of two, the $\delta x$ values are also power of 2. Accordingly, these operations can be easily implemented with a shift register 316. In the case of linear interpolation, FIGS. 2 and 3 show that:

$$\delta x = \pi/2^{j+2} \text{ and } \delta X = (X_i - x_i)\pi/2^{k+1}$$

where: j is the number of bits to address the ROMs 304 and 308 (i.e., $2^{j-1}$=Number of samples in ROM) and k=j+b, where b is the number of bits used to interpolate.

Therefore, $\delta X/\delta x$ is given by:

$$\delta X/\delta x = (X_i - x_i)/2^{k-j-1}$$

In the linear interpolation apparatus of FIG. 3, there is included the two's complement block 310. This block 310 performs a two's complement operation on the input thereof if the bit labeled "D" is 1, otherwise it passes the input value without any change. This is performed when $X_i$ is greater than $x_{i+2}$ The reference change to $x_{i+2}$ and then the distance, is the negative value which correspond to the two's complement of $\delta X_i$.

A similar design can be implemented for a second order approximation based on equation 4. Even higher approximations can be obtained. The circuit design is increasingly complex for higher orders, but better approximations are expected.

Figure 4:
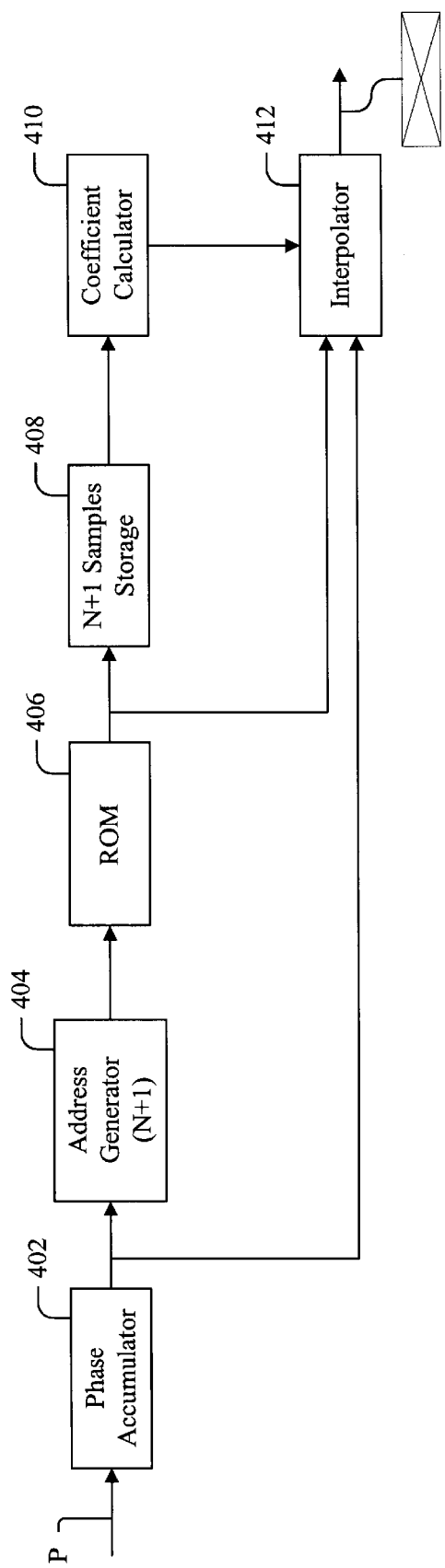
FIG. 4 is a block diagram for illustrating a generalized digital function generator, according to the present invention.

In FIG. 4, there is shown a general apparatus for performing nth order polynomial approximation, according to the present invention. The apparatus of FIG. 4 includes a phase accumulator 402, and address generator 404, ROM 406, sample storage 408, coefficient calculator 410 and interpolator 412. The components 402–412 of the apparatus of FIG. 4 may be implemented with a combination of hardware and/or software using techniques known in the art.

The block 404 takes the N+1 samples around a point to calculate the Nth order polynomial approximation. The block 408 stores N+1 samples $y_i$, $y_{i+1}$, $y_{1+2}$ . . . . The block 410 first calculates $\delta y_i$ and then calculates the corresponding coefficients. The block 412 uses the outputs from the blocks 402, 406 and 410 to calculate $\delta Y_i$. Finally, $Y_i$ is calculated using $Y_i = y_1 + \delta Y_i$ by the block 412.

The apparatus of FIG. 3 is slightly different from that of FIG. 4. The reason for such difference is that in the apparatus of FIG. 3 it is advantageous to use two ROMs 304 and 308, since equation 3 uses the $\delta y_i$ and $\delta y_{i+1}$ values. Accordingly, it is easier to split the samples in two groups as previously discussed. However, the apparatus of FIG. 3 may be implemented using as single ROM 406, as shown in FIG. 4.

For certain applications, there is a need for an alternative method to convert phase into amplitude as in the present invention. For example, the present invention is applicable to an application using a resolution of 0.3 Hz, a frequency range between −15 KHz and 15 kHz and a worst case spur signal of −84 dB.

The number of bits in the phase accumulator 302/402 typically defines the resolution. After some computations, it was found that the number of bits needed to achieve a resolution of 1 Hz [4] is 22 bits. A 22 bit address would imply a large ROM. The proposed invention handles these bits in a different manner to reduce ROM size while maintaining spectral purity. Using the method previously described and the apparatus shown in FIG. 3, the above-noted values are met.

Some practical considerations of the present invention are summarized, for example, as follows:

(i) The sine symmetry can be exploited. Accordingly, one fourth of the sine values (e.g., first quadrant) are stored in the ROMs 304 and 38 and the ROM 406.

(ii) The value in the accumulator 302/402 at the difference between the ROMs 304 and 38 and the ROM 406 should not be greater than:

$$2^a \operatorname{Sin}(\delta x) = \pi 2^{a-j-2}$$

where a is the number of bits per sample in the ROMs 304 and 38 and the ROM 406.

The above results, because since a maximum slope of a sine wave is at phase 0, then a maximum possible difference will be $2^a(\operatorname{Sin}(\delta x) - 0) = 2^a \operatorname{Sin}(\delta x)$.

It turns out that the maximum number of bits needed to store the magnitude in the accumulator 302/402 is:

$$b_{maxacc} = \text{minimum greater integer of } [a-j-0.35] = a-j$$

However, a sign bit is used to handle negative values. Therefore, the maximum number of bits in the accumulator 302/402 is $b_{maxacc} = a-j+1$.

The maximum number of bits in the product between the difference and the output of the two's complement block 310 is $k-j-1+a-j+1 = k+a-2j$. By defining $b = k-j$, then:

$$b_{maxprod} = b+a-j$$

Figure 5:
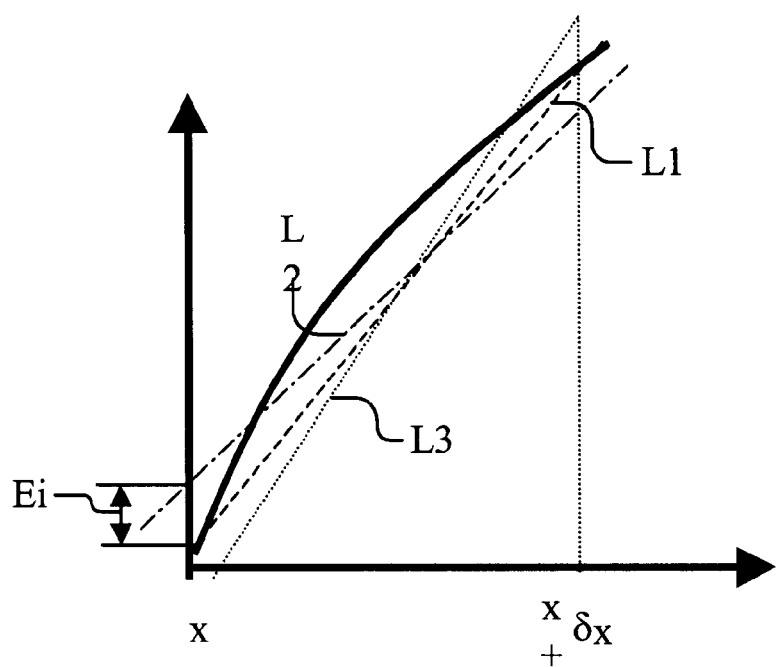
FIG. 5 is a graph for illustrating a minimum quadratic error between a line and a portion of sine wave, according to the present invention.

The spur performance can be improved by finding the best samples to be stored in the ROMs 304 and 38 and the ROM 406. Storing the values for sin(x) does not necessarily provide the best spur performance. Samples to be stored in the ROMs 304 and 38 and the ROM 406 therefore are found by determining a line that minimizes a quadratic error Ei between points thereof and a corresponding section of the sine wave. It is assumed that the lower the error (i.e., the difference between the line and the sine wave), the better the spur performance. As shown in FIG. 5, it is possible that lines L2 or L3 have lower quadratic error value than the line L1. The two points that define the line L1 are two known points sin(x) and sin(x+δx). In contrast, lines L2 and L1 are defined using a single point. A program was written to calculate the minimum quadratic error, as shown in equation 5 below, between a given line and a portion of a sine wave. The parameters that were changed were the slope and offset of the line. The parameters were changed for certain ranges and the error calculated. The minimum error sets the parameters for the line, where:

$$\text{Error} = \sum_{j=0}^{N} (\text{line}(j) - \sin(j))^2 \text{ where: line } (j) = mj + c. \tag{5}$$

In our case, a 4-dB improvement in the spur performance was obtained using lines calculated with a minimum quadratic error.

Figure 6:
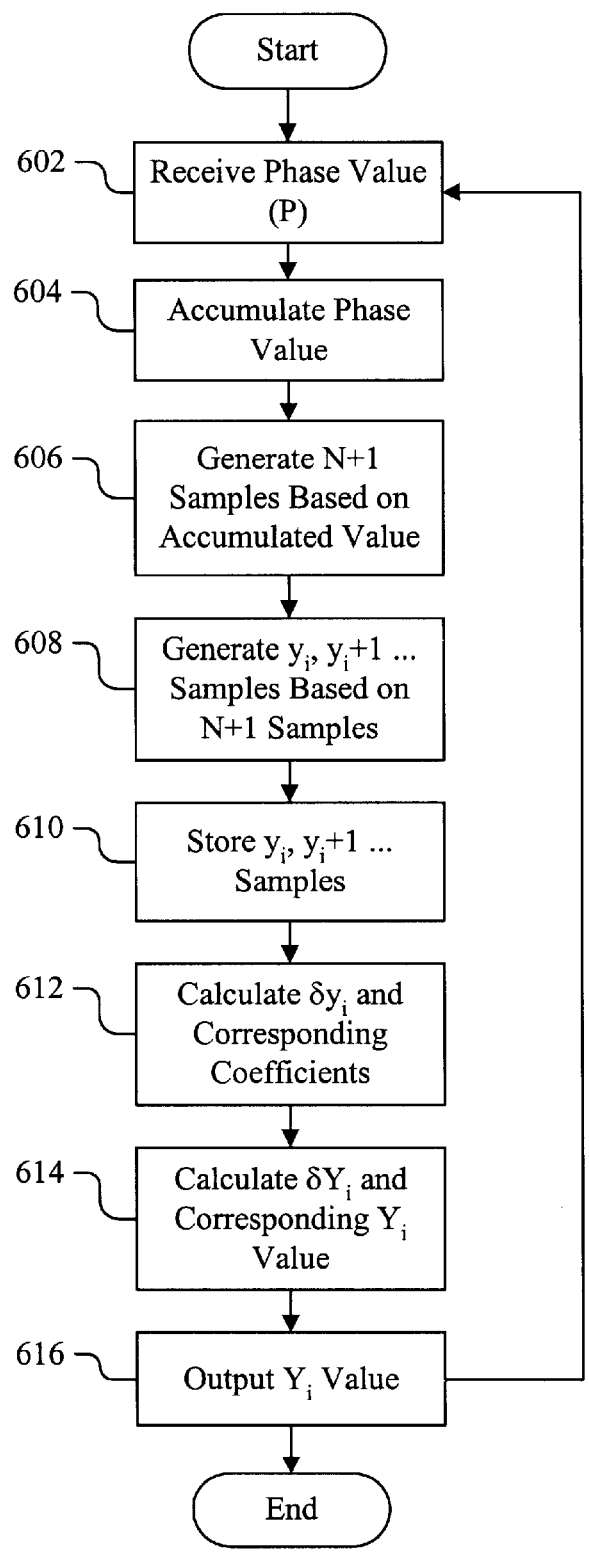
FIG. 6 is a flow chart for illustrating the operation of a digital function generator, according to the present invention.

FIG. 6 is a flow chart for illustrating the operation of a digital function generator, according to the present invention. In FIG. 6, at step 602 a phase value P is received by the phase accumulator 402. At step, 604 the accumulator 302/402 accumulates the phase value P and generates an accumulation result. At step 606, the address generator 404 generates N+1 samples based on the accumulation result. At step 608, the ROM 406 generates N+1 samples $y_i$, $Y_{i+1}$, $Y_{i+2}$ . . . , which are stored at step 610 in the N+1 sample storage 408. At step 612, the coefficient calculator 410 calculates $\delta y_i$ and then calculates the corresponding coefficients. At step 614, the interpolator 412 calculates $\delta Y_i$ and then calculates the corresponding $Y_i$ value. At step 616, the interpolator 412 outputs the calculated $Y_i$ value and returns control to step 602 to process the next phase value P, completing the operation.

Figure 7:
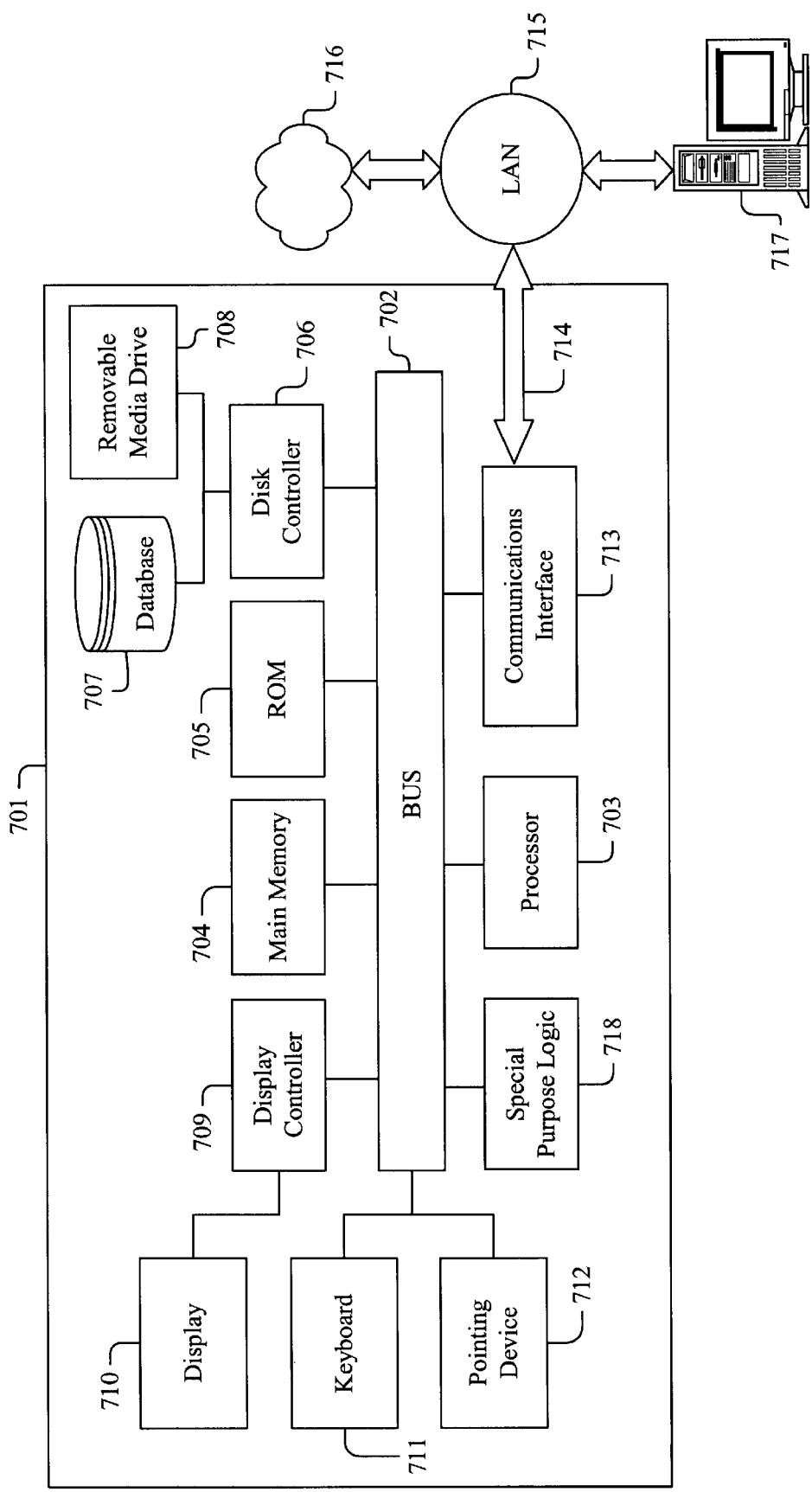
FIG. 7 is an exemplary computer system, which may be programmed to perform one or more of the processes of the present invention.

FIG. 7 illustrates a computer system 701 upon which the present invention (e.g., as described with respect to FIGS. 1–6) can be implemented. The present invention may be implemented on a single such computer system, or a collection of multiple such computer systems. The computer system 701 includes a bus 702 or other communication mechanism for communicating information, and a processor 703 coupled to the bus 702 for processing the information. The computer system 701 also includes a main memory 704, such as a random access memory (RAM), other dynamic storage device (e.g., dynamic RAM (DRAM), static RAM (SRAM), synchronous DRAM (SDRAM)), etc., coupled to the bus 702 for storing information and instructions to be executed by the processor 703. In addition, the main memory 704 can also be used for storing temporary variables or other intermediate information during the execution of instructions by the processor 703. The computer system 701 further includes a read only memory (ROM) 705 or other static storage device (e.g., programmable ROM (PROM), erasable PROM (EPROM), electrically erasable PROM (EEPROM), etc.) coupled to the bus 702 for storing static information and instructions.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices 718, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions (e.g., as described with respect to FIGS. 3 and 4), such as signal processing, image processing, speech processing, voice recognition, infrared (IR) data communications, phase accumulation, address generation, sample storage, coefficient calculation, interpolation, etc.

The computer system 701 may also include a display controller 709 coupled to the bus 702 to control a display 710, such as a cathode ray tube (CRT), liquid crystal display (LCD), active matrix display, plasma display, touch display, etc., for displaying or conveying information to a computer user. The computer system includes input devices, such as a keyboard 711 including alphanumeric and other keys and a pointing device 712, for interacting with a computer user and providing information to the processor 703. The pointing device 712, for example, may be a mouse, a trackball, a pointing stick, etc., or voice recognition processor, etc., for communicating direction information and command selections to the processor 703 and for controlling cursor movement on the display 710. In addition, a printer may provide printed listings of the data structures/information of the system shown in FIG. 1, or any other data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. Execution of the arrangement of instructions contained in the main memory 704 causes the processor 703 to perform the process steps described herein. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

Stored on any one or on a combination of computer readable media, the present invention includes software for controlling the computer system 701, for driving a device or devices for implementing the invention, and for enabling the computer system 701 to interact with a human user (e.g., users of the system 701, etc.). Such software may include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention may be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a digital subscriber line (DSL) card or modem, an integrated services digital network (ISDN) card, a cable modem, a telephone modem, etc., to provide a data communication connection to a corresponding type of telephone line. As another example, communication interface 713 may be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 713 sends and receives electrical, electromagnetic, or optical signals that carry digital data streams representing various types of information. Further, the communication interface 713 can include peripheral interface devices, such as a Universal Serial Bus (USB) interface, a PCMCIA (Personal Computer Memory Card International Association) interface, etc.

The network link 714 typically provides data communication through one or more networks to other data devices. For example, the network link 714 may provide a connection through local area network (LAN) 715 to a host computer 717, which has connectivity to a network 716 (e.g. a wide area network (WAN) or the global packet data communication network now commonly referred to as the "Internet") or to data equipment operated by service provider. The local network 715 and network 716 both use electrical, electromagnetic, or optical signals to convey information and instructions. The signals through the various networks and the signals on network link 714 and through communication interface 713, which communicate digital data with computer system 701, are exemplary forms of carrier waves bearing the information and instructions.

The computer system 701 can send messages and receive data, including program code, through the network(s), network link 714, and communication interface 713. In the Internet example, a server (not shown) might transmit requested code belonging an application program for implementing an embodiment of the present invention through the network 716, LAN 715 and communication interface 713. The processor 703 may execute the transmitted code while being received and/or store the code in storage devices 707 or 708, or other non-volatile storage for later execution. In this manner, computer system 701 may obtain application code in the form of a carrier wave. With the system of FIG. 7, the present invention may be implemented on the Internet as a Web Server 701 performing one or more of the processes according to the present invention for one or more computers coupled to the Web server 701 through the network 716 coupled to the network link 714.

The term "computer readable medium" as used herein refers to any medium that participates in providing instructions to the processor 703 for execution. Such a medium may take many forms, including but not limited to, non-volatile media, volatile media, transmission media, etc. Non-volatile media include, for example, optical or magnetic disks, magneto-optical disks, etc., such as the hard disk 707 or the removable media drive 708. Volatile media include dynamic memory, etc., such as the main memory 704. Transmission media include coaxial cables, copper wire and fiber optics, including the wires that make up the bus 702. Transmission media can also take the form of acoustic, optical, or electromagnetic waves, such as those generated during radio frequency (RF) and infrared (IR) data communications. As stated above, the computer system 701 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer connected to either of networks 715 and 716. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

The present invention stores information relating to various processes described herein. This information is stored in one or more memories, such as a hard disk, optical disk, magneto-optical disk, RAM, etc. One or more databases may store the information used to implement the present invention. The databases are organized using data structures (e.g., records, tables, arrays, fields, graphs, trees, and/or lists) contained in one or more memories, such as the memories listed above or any of the storage devices listed in the discussion of FIG. 7, for example.

The previously described processes include appropriate data structures for storing data collected and/or generated by the processes of the present invention in one or more databases thereof. Such data structures accordingly will includes fields for storing such collected and/or generated data. In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

The present invention (e.g., as described with respect to FIGS. 1–6) may be implemented by the preparation of application-specific integrated circuits or by interconnecting an appropriate network of conventional component circuits, as will be appreciated by those skilled in the electrical art(s). In addition, all or a portion of the invention (e.g., as described with respect to FIGS. 1–6) may be conveniently implemented using one or more conventional general purpose computers, microprocessors, digital signal processors, micro-controllers, etc., programmed according to the teachings of the present invention (e.g., using the computer system of FIG. 7), as will be appreciated by those skilled in the computer and software art(s). Appropriate software can be readily prepared by programmers of ordinary skill based on the teachings of the present disclosure, as will be appreciated by those skilled in the software art. Further, the present invention may be implemented on the World Wide Web (e.g., using the computer system of FIG. 7).

Recapitulating, the present invention provides an alternative method and apparatus for converting phase into amplitude. For every point, coefficients of a polynomial approximation that best fits a function of interest in small portions of a curve of the function are found. In order to do this, a Cartesian coordinate system with origin at a lower or higher closest known point is determined.

This present invention advantageously provides, for example, (i) improvement on spur performance, as compared to other known methods and (ii) allows for more relevant samples to be stored for the same storage capability as in other known methods, since coefficients are calculated rather than stored.

The present invention creates a digital sine wave that may be used, for example, in an incremental phase modulator (IPM) of a typical digital communications transceiver and is applicable to an IPM used in the International Maritime Satellite (Inmarsat) [7] Early Entry System. The present invention is also applicable to any digital application where a function has to be generated digitally, as will be appreciated by those skilled in the relevant art(s).

Although, the present invention is described in terms of digitally generating a sine function, the present invention can be used to generate any function, as will be appreciated by those skilled in the relevant art(s).

While the present invention has been described in connection with a number of embodiments and implementations, the present invention is not so limited but rather covers various modifications and equivalent arrangements, which fall within the purview of the appended claims.

List of References

[1] e.g., as taught in J. Vankka, "Methods of mapping from phase to sine amplitude in direct digital synthesis," IEEE International Frequency control Symposium, 1996.

[2] e.g., as taught in H. T. Nicholas and H. Samueli, "An analysis of the output spectrum of direct digital frequency synthesizers in the presence of phase-accumulator truncation," $41^{st}$ Annual Frequency Control Symposium, 1987.

[3] e.g., as taught in V. Kroupa, "Direct digital frequency synthesizers," IEEE press, 1999.

[4] e.g., as taught in GMR-1 05.510, "GEO-Mobile Radio Interface Specifications; Part 5: Radio interface physical layer specifications; Sub-part 7: Radio Subsystem Synchronization," Available on the World Wide Web at webapp.etsi.org/action/PU/20010320/ts_1013760507v010101p.pdf.

[5] The change in electromagnetic frequency that occurs when the source of the radiation and its observer move towards or away from each other. The faster they come together, the higher the frequency. The faster they move away, the lower the frequency. Discovered by Austrian physicist Christian Doppler (1803–1853), this condition has a great effect on low-earth orbit (LEO) satellites as they weave towards and away from the earth.

[6] A mathematical technique that approximates a function, which has finite, continous derivatives, with a polynomial function. This technique takes higher and higher order derivatives of the function at a chosen point and uses the information to estimate the value of the function at another point.

[7] (Inmarsat, London, inmarsat.org on the World Wide Web) Formerly International Maritime Satellite, it is an international organization founded in 1979 to provide global satellite communications to the maritime industry. Today, it provides satellite service to ships, planes, trains, offshore rigs and mobile phones. COMSAT is the U.S. signatory to Inmarsat.

What is claimed is:

1. A method for digitally generating a function, comprising:
   receiving a phase value and integrating said phase value to generate an accumulation result;
   generating consecutive addresses based on said accumulation result;
   retrieving initial digital function values based on said consecutive addresses;
   generating coefficients for a polynomial interpolation based on said initial digital function values; and
   generating a final digital function value corresponding to said phase value based on said accumulation result and said coefficients.

2. The method of claim 1, wherein said step of retrieving initial digital function values comprises retrieving even and odd initial digital function values.

3. The method of claim 2, wherein said step of generating consecutive addresses comprises:
   generating consecutive addresses for retrieving said even initial digital function values based on portion of said accumulation result; and
   generating consecutive addresses for retrieving said odd initial digital function values based on addition performed on a portion of said accumulation result and a two's compliment of a portion of said accumulation result.

4. The method of claim 3, wherein said step of generating coefficients comprises:
   subtracting said odd initial digital function values from said even initial digital function values to generate a subtraction result;
   multiplying said subtraction result by said two's compliment of said portion of said accumulation result to generate a multiplication result; and
   shifting said multiplication result to generate said coefficients.

5. The method of claim 4, wherein said step of generating a final digital function value comprises:
   adding said odd initial digital function values with said coefficients to generate said final digital function value.

6. A computer-readable medium carrying one or more sequences of one or more instructions for digitally generating a function, the one or more sequences of one or more instructions including instructions which, when executed by one or more processors, cause the one or more processors to perform the following steps:
   receiving a phase value and integrating said phase value to generate an accumulation result;
   generating consecutive addresses based on said accumulation result;
   retrieving initial digital function values based on said consecutive addresses;
   generating coefficients for a polynomial interpolation based on said initial digital function values; and
   generating a final digital function value corresponding to said phase value based on said accumulation result and said coefficients.

7. The computer readable medium of claim 6, wherein said step of retrieving initial digital function values comprises retrieving even and odd initial digital function values.

8. The computer readable medium of claim 7, wherein said step of generating consecutive addresses comprises:
   generating consecutive addresses for retrieving said even initial digital function values based on portion of said accumulation result; and
   generating consecutive addresses for retrieving said odd initial digital function values based on addition performed on a portion of said accumulation result and a two's compliment of a portion of said accumulation result.

9. The computer readable medium of claim 8, wherein said step of generating coefficients comprises:
   subtracting said odd initial digital function values from said even initial digital function values to generate a subtraction result;
   multiplying said subtraction result by said two's compliment of said portion of said accumulation result to generate a multiplication result; and
   shifting said multiplication result to generate said coefficients.

10. The computer readable medium of claim 9, wherein said step of generating a final digital function value comprises:
    adding said odd initial digital function values with said coefficients to generate said final digital function value.

11. An system for digitally generating a function, comprising:
    a phase accumulator configured to receive a phase value and integrate said phase value to generate an accumulation result;
    an address generator configured to generate consecutive addresses based on said accumulation result;
    a storage device configured to retrieve initial digital function values based on said consecutive addresses;
    a coefficient calculator configured to generate coefficients for a polynomial interpolation based on said initial digital function values; and
    an interpolator configured to generate a final digital function value corresponding to said phase value based on said accumulation result and said coefficients.

12. The system of claim 11, wherein said storage device comprises odd and even storage devices for retrieving odd and even initial digital function values, respectively.

13. The system of claim 12, wherein said address generator comprises:
    a portion of said accumulation result configured to generate consecutive addresses for retrieving said even initial digital function values;
    an adder; and
    a two's compliment generator configured to generate a two's compliment of a portion of said accumulation result,
    wherein said adder is configured to add a portion of said accumulation result with said two's compliment of said portion of said accumulation result to generate consecutive addresses for retrieving said odd initial digital function values.

14. The system of claim 13, wherein said coefficient calculator comprises:
- a subtractor configured to subtract said odd initial digital function values from said even initial digital function values to generate a subtraction result;
- a multiplier configured to multiply said subtraction result by said two's compliment of said portion of said accumulation result to generate a multiplication result; and
- a shift register configured to shift said multiplication result to generate said coefficients.

15. The system of claim 14, wherein said interpolator comprises:
- an adder configured to add said odd initial digital function values with said coefficients to generate said final digital function value.

16. An apparatus for digitally generating a function, comprising:
- means for receiving a phase value and integrating said phase value to generate an accumulation result;
- means for generating consecutive addresses based on said accumulation result;
- means for retrieving initial digital function values based on said consecutive addresses;
- means for generating coefficients for a polynomial interpolation based on said initial digital function values; and
- means for generating a final digital function value corresponding to said phase value based on said accumulation result and said coefficients.

* * * * *